United States Patent [19]

Haas et al.

[11] 4,379,861
[45] Apr. 12, 1983

[54] PROCESS FOR THE PRODUCTION OF POLYURETHANES USING MORPHOLINE COMPOUNDS AS CATALYSTS

[75] Inventors: Peter Haas, Haan; Hans-Albrecht Freitag, Bergisch-Gladbach, both of Fed. Rep. of Germany

[73] Assignee: Bayer Aktiengesellschaft, Leverkusen, Fed. Rep. of Germany

[21] Appl. No.: 325,539

[22] Filed: Nov. 27, 1981

[30] Foreign Application Priority Data

Dec. 12, 1980 [DE] Fed. Rep. of Germany ....... 3046905

[51] Int. Cl.³ ............................................. C08G 18/14
[52] U.S. Cl. ..................................... 521/115; 528/53
[58] Field of Search .......................... 521/115; 528/53

[56] References Cited

U.S. PATENT DOCUMENTS 3,476,933 11/1969 Mendelsohn ....................... 521/111
3,786,005 1/1974 Bechara et al. ..................... 521/115

FOREIGN PATENT DOCUMENTS 2042636 3/1972 Fed. Rep. of Germany .
2203404 8/1972 Fed. Rep. of Germany .

Primary Examiner—Maurice J. Welsh
Attorney, Agent, or Firm—Gene Harsh; Joseph C. Gil; Richard A. Elder

[57] ABSTRACT

The invention relates to a process for the preparation of foamed or unfoamed polyurethanes by the reaction of compounds with molecular weights of 400 to 10,000 having at least two isocyanate-reactive hydrogen atoms with polyisocyanates in the presence of catalysts containing tertiary amino groups and optionally in the presence of chain-lengthening agents of molecular weight 32 to 400, foam stabilizers, water and/or organic blowing agents and optionally other auxiliary agents and additives, characterized in that the catalysts are morpholine derivatives of the general formula

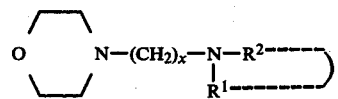

wherein
X is an integer from 3 to 6 and
$R^1$ and $R^2$ are identical or different and
(a) represent a $C_1$–$C_6$-alkyl or $C_6$–$C_{10}$-cycloalkyl group or
(b) form a heterocyclic ring containing 4–7 C-atoms, which heterocyclic ring may contain hetero groups in addition to the N-atom and wherein the additional hetero groups may be substituted by a $C_1$–$C_3$ alkyl, or
(c) together denote a group of the formula

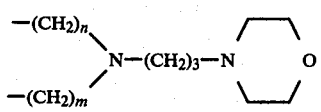

in which n and m are identical or different numbers from 2 to 4, preferably 2, or
(d) represent

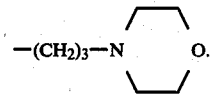

5 Claims, No Drawings

PROCESS FOR THE PRODUCTION OF POLYURETHANES USING MORPHOLINE COMPOUNDS AS CATALYSTS

BACKGROUND OF THE INVENTION

The production of polyurethanes using catalysts containing tertiary amino groups is known. Although a high standard of polyurethane foaming technology has been achieved thereby, practice has shown that improvements are still possible.

Gelling of the foam is usually achieved with a combination of various catalysts, frequently using derivatives of morpholine. These catalysts are advantageously used for the formation of a fine, skin-like structure on the surface of the molded foam parts, for improving the hardening characteristics of the molded articles and for preventing flaws in the foam which occur in the course of the foaming process.

The morpholine derivatives hitherto used have been mainly N-methylmorpholine (NMM) and N-ethylmorpholine (NEM) and more recently dimethylaminoethylmorpholine (DMEM). It is found in foaming practice that when using NMM, NEM or DMEM, unpleasant odors still occur in the production of the foams and upon removal of the foam products from their molds.

The desired effects described above, however, have hitherto not been achievable without the use of these activators. It is therefore an object of the present invention to provide catalysts by which the advantageous characteristics of the activators hitherto used in this technology are preserved, especially as regards formation of the skin and the foaming characteristics, but the unpleasant evolution of odors is considerably reduced or even eliminated.

DESCRIPTION OF THE INVENTION

The invention relates to a process for the preparation of foamed or unfoamed polyurethanes by the reaction of compounds with molecular weights of 400 to 10,000 having at least two isocyanate-reactive hydrogen atoms with polyisocyanates in the presence of catalysts containing tertiary amino groups and optionally in the presence of chain-lengthening agents of molecular weight 32 to 400, foam stabilizers, water and/or organic blowing agents and optionally other auxiliary agents and additives, characterized in that the catalysts are morpholine derivatives of the general formula

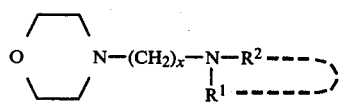

wherein
x is an integer from 3 to 6 and
$R^1$ and $R^2$ are identical or different and
(a) represent a $C_1$–$C_6$-alkyl or $C_6$–$C_{10}$-cycloalkyl group or
(b) form a heterocyclic ring containing 4–7 C-atoms, which heterocyclic ring may contain hetero groups in addition to the N-atom and wherein the additional hetero groups may be substituted by a $C_1$–$C_3$ alkyl, or
(c) together denote a group of the formula

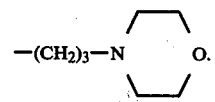

in which n and m are identical or different numbers from 2 to 4, preferably 2, or
(d) represent

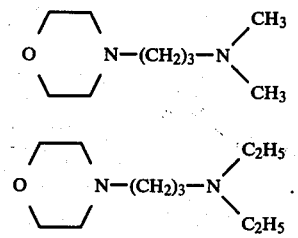

According to the invention, it is preferred to use as morpholine derivatives the compounds

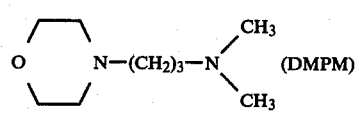

It has surprisingly been found that even if the structure of the DMEM is altered by only one methylene group, in other words to the dimethylaminopropylmorpholine $$O\!\!-\!\!N\!-\!(CH_2)_3\!-\!N(CH_3)_2 \quad (DMPM)$$

a compound with completely different working characteristics is obtained. While the catalytic characteristics as regards the required skin-forming and cell-forming effects, and the short mold release times are surprisingly good, the use of this activator in the production of polyurethane results in a remarkable difference relative to the formation of odor compared with NMM, NEM and DMEM.

Even the pure substances of DMEM and DMPM show significant differences in their odor characteristics. Whereas DMEM has an odor similar to pyridine, DMPM has only a very slight odor which cannot be regarded as disturbing, a characteristic which has more effect during foaming and on removal of a polyurethane product from its mold.

This tendency toward less odor is also seen in the more highly alkylated derivatives of aminopropylmorpholine and amines multi-substituted by morpholinopropyl groups used according to the invention.

Another surprising feature is the good overall reactivity (resting times and rise times) obtained by the catalysis according to the invention, in spite of the fact that the catalytic properties of dimethylaminopropylmorpholine (DMPM) have been graded as very moderate when investigated for the reaction kinetics of urethane reactions (J. Burkus, J. Org. Chem. 26,779 (1961)).

The following are examples of catalysts which may be used according to the invention:

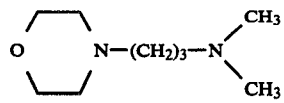

(preferred)
(described in CA55: 233036)

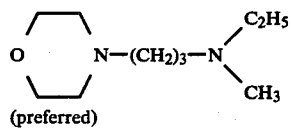

(preferred)

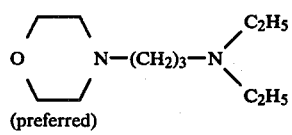

(preferred)

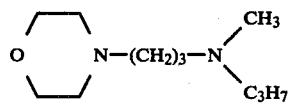

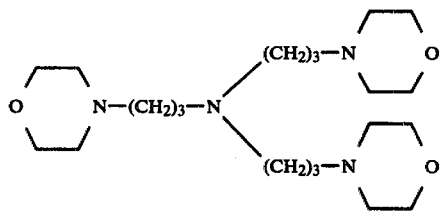

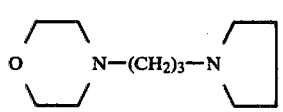

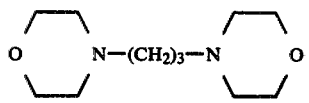

(preferred)

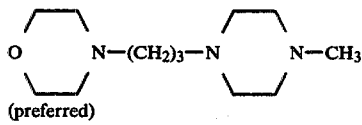

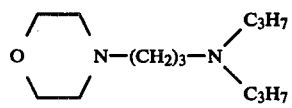

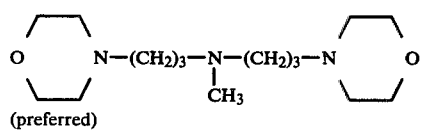

(preferred)

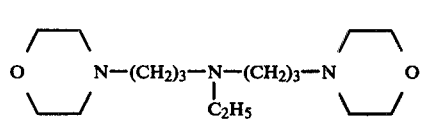

The catalysts used according to the invention are water-clear liquids having a slight characteristic odor which is not considered unpleasant. Based on 100 parts of a reaction mixture of polyisocyanates and compounds with molecular weights of 400 to 10,000 containing at least two isocyanate-reactive hydrogen atoms, these catalysts are used in a quantity of from 0.3 to 5.0 parts, optionally as mixtures with each other.

Their preparation is carried out in a known manner, e.g., by the Leuckart-Wallach reaction.

According to the invention, in many cases it is preferred to use the known catalysts of polyurethane chemistry, e.g., those mentioned in German Offenlegungsschrift No. 2,854,384, pages 26 to 29 and 31 to 33, in addition to the morpholine derivatives used according to the invention, these known catalysts being generally used in a quantity of from 5 to 100% by weight, based on the quantity of morpholine derivatives.

The following are used for carrying out the process according to the invention:

1. As starting components: aliphatic, cycloaliphatic, araliphatic, aromatic and heterocyclic polyisocyanates such as those described by W. Seifken in Justus Liebigs Annalen der Chemie, 562, pages 75 to 136, for example, those of the formula:

$$Q(NCO)_n$$

wherein
n=2-4, preferably 2, and
Q denotes an aliphatic hydrocarbon group having 2-18, preferably 6-10, C-atoms;
a cycloaliphatic hydrocarbon group having 4-15, preferably 5-10, C-atoms;
an aromatic hydrocarbon group having 6-15, preferably 6-13, C-atoms; or
an araliphatic hydrocarbon group having 8-15, preferably 8-13, C-atoms, e.g., polyisocyanates of the kind described in German Offenlegungsschrift No. 2,832,253, pages 10-11.

Particularly preferred are the commercially available polyisocyanates, e.g., 2,4- and 2,6-tolylenediisocyanate and any mixtures of these isomers ("TDI"); polyphenyl-polymethylene polyisocyanates which may be prepared by aniline-formaldehyde condensation followed by phosgenation ("crude MDI"); and polyisocyanates having carbodiimide groups, urethane groups, allophanate groups, isocyanaurate groups, urea groups or biuret groups ("modified polyisocyanates"), in particular those modified polyisocyanates which are derived from 2,4- and/or 2,6-tolylene diisocyanate or from 4,4'- and/or 2,4'-diphenylmethane diisocyanate.

2. As starting components, also: compounds having at least two isocyanate-reactive hydrogen atoms and a molecular weight generally of 400 to 10,000. By these are meant, apart from compounds having amino groups, thiol groups or carboxyl groups, preferably compounds having hydroxyl groups, in particular compounds having 2 to 8 hydroxyl groups, especially those with a molecular weight of 1000 to 6000, preferably 2000 to 4000. Examples of these compounds include polyesters, polyethers, polythioethers, polyacetals, polycarbonates and polyester amides having at least 2, generally 2 to 8, but preferably 2 to 4 hydroxyl groups, such as those which are known for the production of homogeneous and cellular polyurethanes and which have been described, e.g., in German Offenlegungsschrift No. 2,832,253, pages 11-18.

3. Optionally, as starting components: compounds having at least two isocyanate-reactive hydrogen atoms and a molecular weight of from 32 to 400. These are understood to be compounds having hydroxyl groups and/or amino groups and/or thiol groups and/or carboxyl groups, preferably compounds having hydroxyl groups and/or amino groups, which serve as chain lengthening agents or cross-linking agents. These compounds generally have 2 to 8, preferably 2 to 4, isocyanate-reactive hydrogen atoms. Examples of these are described in German Auslegeschrift No. 2,832,253, pages 19-20.

4. Optionally, auxiliary agents and additives: such as (a) water and/or readily-volatile inorganic or organic substances as blowing agents (in the case of the production of foams);

(b) catalysts of known type;

(c) surface-active additives, such as emulsifiers and foam stabilizers;

(d) reaction retarders, e.g., substances which are acid in reaction, such as hydrochloric acid or organic acid halides; cell regulators of known type, such as paraffins or fatty alcohols or dimethylpolysiloxanes; pigments or dyes and flame protective agents of known type, e.g., tris-chloroethylphosphate, tricresyl phosphate or ammonium phosphate and polyphosphate; also stabilizers against ageing and weathering, plasticizers and fungistatic and bacteriostatic substances as well as fillers such as barium sulphate, kieselguhr, carbon black or whiting.

These optional auxiliary agents and additives have been described, for example, in German Offenlegungsschrift No. 2,732,292, pages 21-24. And further examples of surface-active additives and foam stabilizers, as well as cell regulators, reaction retarders, stabilizers, flame retarding substances, plasticizers, dyes and fillers and fungistatic and bacteriostatic substances optionally used according to the invention in addition to details concerning the methods of using these additives and their mode of action are described in Kunststoff-Handbuch, Volume VII, published by Vieweg und Höchtlen, Carl-Hanser-Verlag, Munich, 1966, e.g. on pages 103 to 113.

According to the invention, the above-described components are reacted by the known one-shot process, prepolymer process or semiprepolymer process, often using mechanical devices, e.g., those described in U.S. Pat. No. 2,764,565. Details concerning processing equipment which may also be used according to the invention are given in Kunststoff Handbuch, Volume VII, published by Vieweg and Höchtlen, Carl-Hanser-Verlag, Munich 1966, e.g., on pages 121 to 205.

In the production of the foams according to the invention, foaming is preferably carried out in closed molds. In this method, the reaction mixture is introduced into a mold of, for example, metal, e.g., aluminum, or plactics, e.g., epoxide resin. The foamable reaction mixture foams up inside the mold and forms the molded product. Foaming in the mold may be carried out in such a manner that the molded product has a cellular structure on its surface, or it may be carried out so that the molded product has a compact skin and a cellular core. According to the invention, the product having a cellular structure on its surface may be produced by introducing just enough foamable reaction mixture into the mold to fill the mold with foam. Alternatively, an integral skin foam may be produced by introducing a larger quantity of foamable reaction mixture into the mold than is necessary for filling the interior of the mold with foam, a procedure known as "overcharging", as disclosed, e.g., in U.S. Pat. Nos. 3,178,490 and 3,182,104.

In the preferred method of foaming in a mold, "external mold release agents" such as silicone oils are frequently used. "Internal mold release agents" (as disclosed e.g., in German Offenlegungsschriften Nos. 2,121,670 and 2,307,589) may also be used, optionally as mixtures with external mold release agents.

According to the invention, it is preferred to foam the products in a cold mold (cold-setting molded foams) (see British Patent No. 1,162,517, German Offenlegungsschrift No. 2,153,086).

Foams may, however, also be produced according to this invention by block foaming or by the known laminator process.

The products obtainable according to the invention are used, e.g., for automobile seats, arm rests, structural elements, mattresses, refrigeration furniture, insulation for deep freeze housings, roof insulations, insulating plates for the building industry and structural panels (sandwich panels).

The following examples serve to illustrate the invention without restricting it in any way.

Production of the catalysts (A) Dimethylaminopropylmorpholine 10300 ml of methanolic formaldehyde solution (100 ml corresponds to 1 mol) are forced under pressure into 7.4 kg (51.4 mol) of 3-aminopropylmorpholine and 300 g of Raney nickel at 110° C. over a period of 6 hours and hydrogenated for 3 hours at 140 bar, suction filtered, concentrated by evaporation and distilled.

B.p. $_{0.03}$: 60° C.; yield: 6550 g, corresponding to 73% of the theoretical yield. Purity according to gas chromatogram: 98.3%; $n_D^{20}$: 1.4602. The compound is characterized by a faint, not unpleasant odor of amine.

(B) Bis-(morpholinopropyl)-methylamine

When the residue of (A) is distilled, 400 g of the compound:

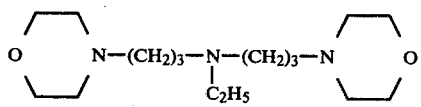

$C_{15}H_{31}N_3O_2$(285) are obtained as higher boiling amine (b.p.$_{0.4}$: 160° C.).

Molar mass found: 290 (titration); the structure was confirmed by $^1$H-NMR; purity according to gas chromatogram: 96.7%; the amine has little odor.

(C) Diethylaminopropylmorpholine 264 g (6 mol) of acetaldehyde are forced into 432 g (3 mol) of aminopropylmorpholine and 60 g of Raney nickel at 110° C. over a period of 3 hours and hydrogenated and distilled at 140 bar; b.p. $_{0.1}$: 60°–62° C., 310 g, corresponding to 52% of the theoretical yield. Purity according to gas chromatogram: 95%; molecular weight found: 192 v. that calculated for $C_{11}H_{24}N_2O$: 200. The compound is odorless.

(D) Bis-(morpholinopropyl)-ethylamine

When the residue from (C) is distilled, 95 g of a substance, b.p. $_{0.1}$: 140°–144° C., is obtained; this substance is

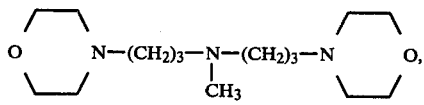

$C_{16}H_{33}N_3O_2$ (299).

Molar mass found: 295, purity according to gas chromatogram: 96%; the structure is further confirmed by $^1$H-NMR; and the compound is odorless.

(E) Dipropylaminopropylmorpholine 348 g (6 mol of propionaldehyde is pumped into 432 g (3 mol) of aminopropylmorpholine and 60 g of Raney nickel at 120° C. and hydrogenated at 140 bar. B.p.$_{0.03}$: 76° C.; purity according to gas chromatogram: 96.5%; yield: 235 g; molar mass found: 220 v. the molecular weight calculated for $C_{13}H_{28}N_2O$: 228; and the compound is odorless.

(F) Bis-(morpholinopropyl)-propylamine

Distillation of the residue (E) yields 80 g of a substance of b.p.$_{0.03}$ 155° C. which corresponds to the following formula:

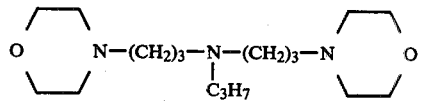

$C_{17}H_{35}N_3O_2$ (313):

Molar mass found: 303; purity according to gas chromatogram: 95.5%; the structure is further confirmed by $^1$H-NMR.

(G) Morpholinopropylpyrrolidine 143 g (1 mol) of 3-morpholinopropionaldehyde in 143 g of dioxane are pumped into 71 g (1 mol) of pyrrolidine and 40 g of Raney nickel at 120° C. and hydrogenated at 160 bar. The reaction mixture is suction filtered, concentrated by evaporation and distilled. B.p. $_{0.1}$: 82° C., purity according to gas chromatogram: 94.5%. Yield: 51 g; molar mass found: 196 v. the molecular weight calculated for $C_{11}H_{22}N_2O$: 198.

(H) Tris-(morpholinopropyl)-amine 143 g (1 mol) of 3-morpholinopropionaldehyde in 143 g of dioxane are pumped into 72 g (0.5 mol) of aminopropylmorpholine and 30 g of Raney nickel at 120° C. and hydrogenated at 180 bar.

B.p.$_{0.08}$: 170° C.; purity according to gas chromatogram: 91%; yield: 48 g; molar mass found: 387 v. the molecular weight calculated for $C_{21}H_{42}N_4O_3$: 398; the structure is further confirmed by $^1$H-NMR.

(I) N-morpholinopropyl-N'-methyl-piperazine 143 g (1 mol) of morpholinopropionaldehyde in 143 g of dioxane are forced into 100 g (1 mol) of N-methylpiperazine and 30 g of Raney nickel at 115° C. and a hydrogen pressure of 140 bar, and hydrogenated for 2 hours. The reaction mixture is suction filtered, concentrated by evaporation and distilled.

B.p.$_{0.05}$: 125° C.; yield: 70 g; purity according to gas chromatogram: 97.9%; molecular weight: 216 (found) v. that calculated for $C_{12}H_{25}N_3O$: 227: Calc.: C 64.4% H 10.5% N 18.5%. Found: C 68.7% H 10.0% N 18.1%.

The structure is further confirmed by $^1$H-NMR.

Processing Examples Using These Catalysts

The following examples are based on the reaction of commercial isocyanates with commercial trifunctional polyethers prepared by the addition of propylene oxide (PO) and ethylene oxide (EO) to trimethylolpropane. Aluminum box molds were used at about 45° C.

| Example 1 | | a | b | c | d |
|---|---|---|---|---|---|
| Trifunctional polyether+ with OH number 28: | Parts by weight | 100 | 100 | 100 | 100 |
| Water: | " | 3.2 | 3.2 | 3.2 | 3.2 |
| Bis-dimethylaminodiethylether: | " | 0.1 | 0.1 | 0.1 | 0.1 |
| Triethylenediamine: (33% in dipropylene glycol) | " | 0.4 | 0.4 | 0.4 | 0.4 |
| Commercial foam stabilizer++: | " | 1.0 | 1.0 | 1.0 | 1.0 |
| DMPM (according to a): | " | 0.7 | | | |
| NMM: | " | | 0.7 | | |
| NEM: | " | | | 0.9 | |
| DMEM: | " | | | | 0.7 |
| Commercial mixture of TDI and crude MDI (isocyanate content: 44.5%)+++ (Index 100): | | 38.1 | 38.1 | 38.1 | 38.1 |
| Resting time (sec): | | 4 | 5 | 5 | 4 |
| Thread drawing time (sec): | | 47 | 57 | 50 | 46 |
| Rise time (sec): | | 75 | 87 | 82 | 80 |
| 10 l box molded part Gross density (kg/m$^3$): | | 36 | 34 | 34 | 35 |
| Compression resistance (kPa) DIN 53577: | | 2.1 | 2.15 | 2.05 | 2.0 |
| Tensile strength (kPa) DIN 53571: | | 80 | 90 | 85 | 85 |
| Elongation at break (%) DIN 53571: | | 150 | 160 | 150 | 145 |
| Pressure deformation residue DIN 53572 (%): at 90% deformation | | 5.9 | 4.7 | 5.0 | 5.8 |

DMPM (according to A) used in cocatalysis with bis-dimethylaminoethyl-ether and triethylenediamine (33% in dipropylene glycol) provides similar foaming characteristics and comparable foams to the conventional morpholine derivatives NMM, NEM and DMEM. When DMPM is used, the odor produced during foaming, release from the molds and application of pressure to the molded parts is substantially less than that produced when using NMM and NEM and even when using DMEM.
+weight ratio PO/EO = 87/13
++(KS 43, Bayer AG)
+++(Desmodur VT 06, Bayer AG, Germany)

| Example 2 | | a | b |
|---|---|---|---|
| Trifunctional polyether+ with OH number 28: | Parts by weight | 100 | 100 |
| Water: | " | 3.1 | 3.1 |
| Triethylenediamine: (33% in dipropylene glycol) | " | 0.8 | 0.8 |
| Commercial foam stabilizer++: | " | 1.0 | 1.0 |
| DMPM (according to A): | " | 0.5 | |
| DMEM: | " | | 0.5 |
| Commercial mixture of TDI and crude MDI (isocyanate content: 44.5%)+++ (Index 100): | | 37.1 | 37.1 |
| Resting time (sec.): | | 6 | 5 |
| Thread drawing time (sec.): | | 53 | 51 |
| Rise time (sec.): | | 82 | 79 |
| 10 l box molded part: Gross density (kg/mm$^3$): | | 35 | 35 |
| Compression resistance (kPa) DIN 53577: | | 1.97 | 2.04 |
| Tensile strength (kPa) DIN 53571: | | 80 | 70 |
| Elongation at break (%) DIN 53571: | | 145 | 135 |
| Pressure deformation residue DIN 53572 (%): at 90% deformation | | 6.0 | 6.3 |

When triethylenediamine (33% in dipropylene glycol) is used alone as catalyst, the use of DMPM (according to A) results in a significant reduction in odor during foaming and during application of pressure to the molded parts compared with that produced when using DMEM.
+weight ratio PO/EO = 87/13
++(KS 43, Bayer AG, Germany)
+++(Desmodure VT 06, Bayer AG, Germany)

| Example 3 | | a | b |
|---|---|---|---|
| Trifunctional polyether+ with OH number 28: | Parts by weight | 100 | 100 |
| Water: | " | 3.2 | 3.2 |
| Bis-dimethylaminoethyl-ether: | " | 0.2 | 0.2 |
| Commercial foam stabilizer++: | " | 1.0 | 1.0 |
| DMPM (according to A): | " | 1.0 | |
| DMEM: | " | | 1.0 |
| Commercial mixture of TDI and crude DMI (isocyanate content: 44.5%)+++ (Index 100): | | 38.1 | 38.1 |
| Resting time (sec.): | | 5 | 5 |
| Thread drawing time (sec.): | | 55 | 53 |
| Rise time (sec.): | | 65 | 69 |
| 10 l box molded part: | | | |

-continued

Processing Examples Using These Catalysts

The following examples are based on the reaction of commercial isocyanates with commercial trifunctional polyethers prepared by the addition of propylene oxide (PO) and ethylene oxide (EO) to trimethylolpropane. Aluminum box molds were used at about 45° C.

| | | |
|---|---|---|
| Gross density (kg/m³): | 35 | 35 |
| Compression resistance (kPa) DIN 53577: | 1.92 | 2.04 |
| Tensile strength (kPa) DIN 53571: | 80 | 85 |
| Elongation at break (%) DIN 53571: | 150 | 160 |
| Pressure deformation residue DIN 53572 (%): at 90% deformation | 7.0 | 6.0 |

When bis-dimethylaminoethyl-ether is used alone as catalyst, the use of DMPM (according to A) results in a significant reduction in odor during the foaming process and during application of pressure to the molded parts compared with that produced when using DMEM.

+weight ratio PO/EO = 87/13
++(KS 43, Bayer AG, Germany)
+++(Desmodur VT 06, Bayer AG, Germany)

| Example 4 | | a | b |
|---|---|---|---|
| Trifunctional polyether+ with OH number 28: | Parts by weight | 100 | 100 |
| Water: | " | 3.2 | 3.2 |
| Bis-dimethylaminoethyl-ether: | " | 0.1 | 0.1 |
| Triethylenediamine: (33% in dipropyleneglycol) | " | 0.4 | 0.4 |
| Commercial foam stabilizer++: | " | 1.0 | 1.0 |
| DMPM (according to a): | " | 0.7 | |
| DMEM: | " | | 0.7 |
| Commercial modified TDI (isocyanate content 39.5%)+++ (Index 100): | | 43.0 | 43.0 |
| Resting time (sec.): | | 5 | 5 |
| Thread drawing time (sec.): | | 47 | 42 |
| Rise time (sec.): | | 77 | 71 |
| 10 l box molded part: | | | |
| Gross density (kg/m³): | | 33 | 34 |
| Compression resistance (kPa) DIN 53577: | | 1.67 | 1.66 |
| Tensile strength (kPa) DIN 53571: | | 65 | 75 |
| Elongation at break (%) DIN 53571: | | 135 | 140 |
| Pressure deformation residue DIN 53572 (%): at 90% deformation | | sticks | sticks |

If an isocyanate other than that of Example 1 is used, the use of DMPM (according to A) results in a significant reduction in odor during the foaming process and during application of pressure to the molded parts compared with that produced when using DMEM.

+weight ratio PO/EO = 87/13
++(KS 43, Bayer AG, Germany)
+++(Desmodur MT 10, Bayer AG, Germany)

| Example 5 | | a | b | c |
|---|---|---|---|---|
| Trifunctional polyether+ with OH number 28: | Parts by weight | 100 | 100 | 100 |
| Water: | " | 3.2 | 3.2 | 3.2 |
| Bis-dimethylaminoethyl-ether: | " | 0.1 | 0.1 | 0.1 |
| Triethylenediamine: (33% in dipropyleneglycol) | " | 0.4 | 0.4 | 0.4 |
| Commercial foam stabilizer++: | " | 1.0 | 1.0 | 1.0 |
| Methyl-bis-morpholino-propyl-amine (according to B): | " | 1.5 | | |
| N—diethylaminopropylmorpholine (according to C): | | | 1.0 | |
| N—methylmorpholine: | " | | | 0.7 |
| Commercial mixture of TDI and crude MDI (isocyanate content: 44.5%)+++ (Index 100): | | 38.1 | 38.1 | 38.1 |
| Resting time (sec): | | 5 | 6 | 5 |
| Thread drawing time (sec): | | 63 | 58 | 57 |
| Rise time (sec.): | | 95 | 98 | 87 |
| 10 l box molded part: | | | | |
| Gross density (kg/m³): | | 35 | 37 | 34 |
| Compression resistance (kPa) DIN 53577: | | 1.95 | 2.03 | 2.15 |
| Tensile strength (kPa) DIN 53571: | | 80 | 110 | 90 |
| Elongation at break (%) DIN 53571: | | 150 | 160 | 160 |
| Pressure deformation residue (%) DIN 53572: at 90% deformation | | 6.1 | 7.0 | 4.7 |

+weight ratio PO/EO = 87/13
++(Stabilisator KS 43, Bayer AG, Germany)
+++(Desmodur VT 06, Bayer AG, Germany)

As a supplement to Example 1, it is demonstrated that N-aminopropylmorpholine derivatives having a higher molecular weight than DMPM, e.g. N-diethylaminopropylmorpholine according to (C) and methyl-bis-(morpholino-propyl)-amine according to (B), must be used at a higher concentration to achieve similar foaming times, but the advantage obtained as regards the problem of odor is preserved.

What is claimed is:

1. A process for the production of polyurethanes by the reaction of compounds with a molecular weight of 400 to 10000 having at least two isocyanate reactive hydrogen atoms with polyisocyanates in the presence of catalysts having tertiary amino groups and optionally in the presence of chain lengthening agents of molecular weight 32 to 400, foam stabilizers, water and/or organic blowing agents and other auxiliary agents and additives, the improvement whereby the catalysts used are morpholine derivatives of the general formula

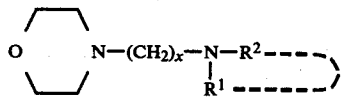

wherein
X denotes an integer from 3 to 6, and
$R^1$ and $R^2$ are identical or different and
(a) represent a $C_1$–$C_6$-alkyl or $C_6$–$C_{10}$-cycloalkyl group or
(b) form a heterocyclic ring containing 4–7 C-atoms, which heterocyclic ring may contain hetero groups in addition to the N-atom and wherein the additional hetero groups may be substituted by a $C_1$–$C_3$ alkyl, or
(c) together represent a group of the formula

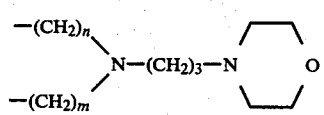

in which n and m represent identical or different integers from 2 to 4, preferably 2, or
(d) represent

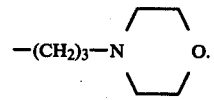

2. A process according to claim 1, characterized in that the compound:

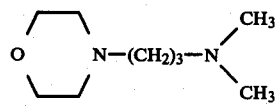

is used as the morpholine derivative.

3. A process according to claim 1, characterized in that the compound:

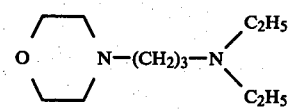

is used as the morpholine derivative.

4. A process according to claims 1 or 2 or 3, characterized in that foamed polyurethanes are produced.

5. A process according to claim 1, characterized in that other catalysts known in polyurethane chemistry are used in addition to the morpholine derivatives.

* * * * *